United States Patent [19]

Connell

[11] 4,158,124

[45] Jun. 12, 1979

[54] METHOD AND APPARATUS FOR POSITION AND OSCILLATION CONTROL IN AUTOMATIC ELECTRIC WELDING

[75] Inventor: Talbert D. Connell, Conroe, Tex.

[73] Assignee: Crutcher Resources Corporation, Houston, Tex.

[21] Appl. No.: 853,184

[22] Filed: Nov. 21, 1977

[51] Int. Cl.² .............................................. B23K 9/12
[52] U.S. Cl. ............................. 219/125.12; 219/60 A; 219/61; 228/27
[58] Field of Search ...................... 219/60 A, 60 R, 61, 219/124.1, 124.34, 125.12, 130.32; 228/27, 28

[56] References Cited

U.S. PATENT DOCUMENTS

| | | | |
|---|---|---|---|
| 3,530,359 | 9/1970 | Grist ................................ | 219/130.32 |
| 3,621,183 | 11/1971 | Chambonnet ..................... | 219/60 R |
| 3,646,309 | 2/1972 | Smith, Jr. et al. ................ | 219/60 R |
| 3,783,222 | 1/1974 | Gwin et al. ...................... | 219/125.12 |
| 3,806,694 | 4/1974 | Nelson et al. .................... | 219/125.12 |

*Primary Examiner*—Bruce A. Reynolds
*Assistant Examiner*—Clifford C. Shaw
*Attorney, Agent, or Firm*—Richards, Harris & Medlock

[57] ABSTRACT

An apparatus for welding the adjoining ends of annular work members, such as lengths of pipe, employing an arc nozzle for melting and depositing metal in the gap between said adjoining ends. A drive motor coupled to the nozzle drives the nozzle laterally back and forth across the gap while the current that flows in said arc is integrated to generate a physical representation of magnitude of the integral. Means are provided to arrest the motor each time the magnitude reaches a predetermined threshold value, and to reverse the direction of travel of the motor.

12 Claims, 3 Drawing Figures

METHOD AND APPARATUS FOR POSITION AND OSCILLATION CONTROL IN AUTOMATIC ELECTRIC WELDING

BACKGROUND AND PRIOR ART

The present invention relates to a method and apparatus for automatically controlling critical variables in welding, especially in automatic or semiautomatic arc welding. The method and apparatus are applicable to various types of welding operations, including the joining edge to edge of flat metal plates, curved plates, beams, bars and the like. A particular application is to the welding of girth joints between hollow annular objects such as lengths of large diameter pipes in the building of pipelines where the work cannot be rotated. It will be understood, of course, that the invention is not limited to this particular application, but the welding of pipeline joints is in some respects highly critical and a preferred embodiment of the present invention in the form of a pipeline welding system will therefore be described in detail.

The welding of pipelines is often a highly technical procedure, partly because it must be done in the field under adverse conditions and partly because of the very high standards or specifications required in oil and gas pipelines where leaks or breaks are hazardous and losses of the products are expensive. For many years, such lines have usually been welded manually by highly skilled craftsmen, which is costly and not entirely satisfactory, particularly as specifications and safety requirements have been upgraded. In more recent years automatic or semiautomatic procedures and equipment have come into use; some of these have proved to be quite satisfactory but the best of them encounter problems. Among those which have proved to be the most acceptable are methods and apparatus described in Nelson et al U.S. Pat. Nos. 3,461,264, 3,561,320, and 3,632,959, which involve the making of a first internal weld pass or "stringer bead", the weld later being finished by external passes. For the latter, devices and methods such as described in U.S. Pat. Nos. 3,604,612, 3,718,798 and 3,806,694, for example, have been widely and successfully used. Other procedures have been proposed, as in U.S. Pat. Nos. 3,009,048, 3,084,286, 3,135,850, 3,266,700 and others.

One problem which is common to most of the processes and equipment of the prior art is close control of position of the arc at all times during the welding operation. The most successful processes at present involve a very narrow gap which is to be filled with weld metal. The arc may tend to wander from a true path, due to imperfections in the equipment or lack of precise control of the arc travel. Lateral movements may not properly be controlled when the arc is oscillated as is necessary to fill broader parts of the weld. Associated variables include travel speed, wire feed rate, width of the path or scope of lateral oscillation, alignment of the equipment with the end joint, imperfections in the cutting or preparation of the end surfaces to be joined, and the like. All such variables are important and any or all of them can lead to imperfections in welds.

Small deviations from true center line of travel of the arc along the weld path are often particularly troublesome. Highly skilled operators, controlling the equipment manually can often avoid or minimize the difficulty occasioned by such deviations, but such skilled operators, often are not available. For example, a deep narrow gap must be filled between ends of thick wall pipe. The gap may be less than a quarter of an inch wide. Lateral oscillation of the welder head is required to place a proper weld. Very little deviation from the true or ideal path can be tolerated. Defective welds can result where a side of the gap is either too close or too far from the ends of the lateral traverse of the arc. Prior welders have not been successful in giving automatic and precise guidance or control of width of reciprocation path as the arc travels along narrow gaps.

The present invention is directed to means and a method for maintaining automatic control of the path of travel of the welding head.

Some investigators in the prior art have recognized the problem and have made various efforts to solve it. In U.S. Pat. No. 3,084,264, for example, it was proposed to abut the pipe ends closely together and then to cut a kerf or gap of precise dimensions so as to avoid difficulties associated with variations in width of the gap. In another approach both U.S. Pat. Nos. 3,084,264 and 3,748,433, disclose mechanical feelers which ride along the gap to correct the head position mechanically. One difficulty with such control is that the gap is often irregular or contains small obstructions, such as particles of metal spatter from a previous welding pass, and the like. Attempts have been made to use light sensitive devices to sense and follow the gap.

According to the present invention, means are used to detect certain electrical or analogous phenomena associated with the arc itself, to sense objectionable deviations from the desired travel path before it proceeds so far as to cause trouble, and to initiate corrective action. The corrective action may be mechanical, hydraulic, or otherwise. Automatic operation and control is achieved in the preferred embodiment of the present invention.

In accordance with the invention an apparatus is provided for welding the adjoining ends of annular work members, such as lengths of pipe where a gas shielded arc nozzle serves to melt a depositing metal in the gap between the adjoining ends. A drive motor coupled to the nozzle drives said nozzle laterally back and forth across the gap while the current that flows in said arc during each traverse is integrated to generate a physical representation of magnitude of the integral. Means are provided to arrest the motor each time the integrated magnitude reaches a predetermined threshold value, and to reverse the direction of travel of the motor.

DESCRIPTION OF THE PREFERRED EMBODIMENTS

Figure 1:
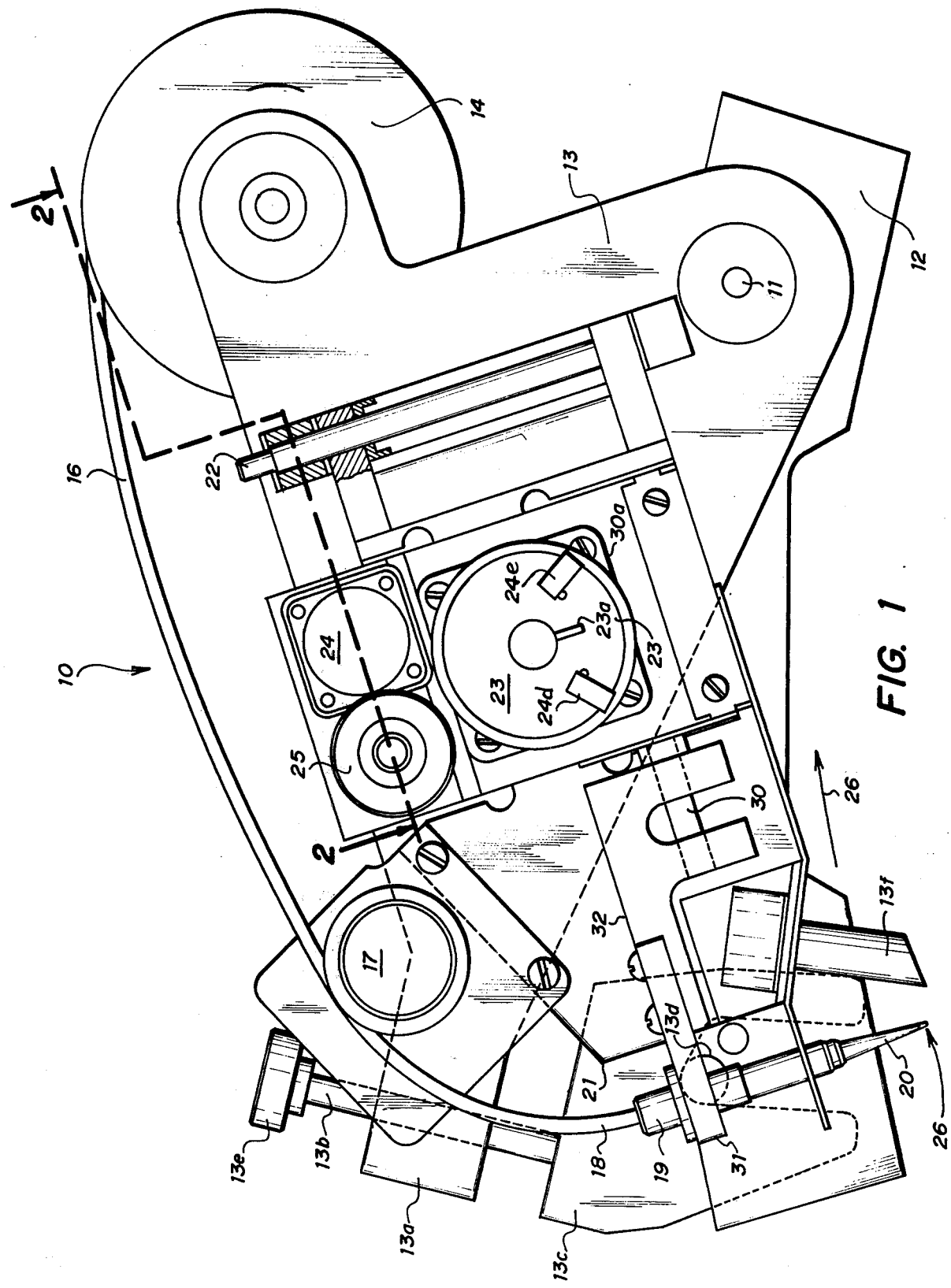
FIG. 1 is a side view, showing the essential elements of a pipeline welding machine embodying the present invention.
Figure 2:
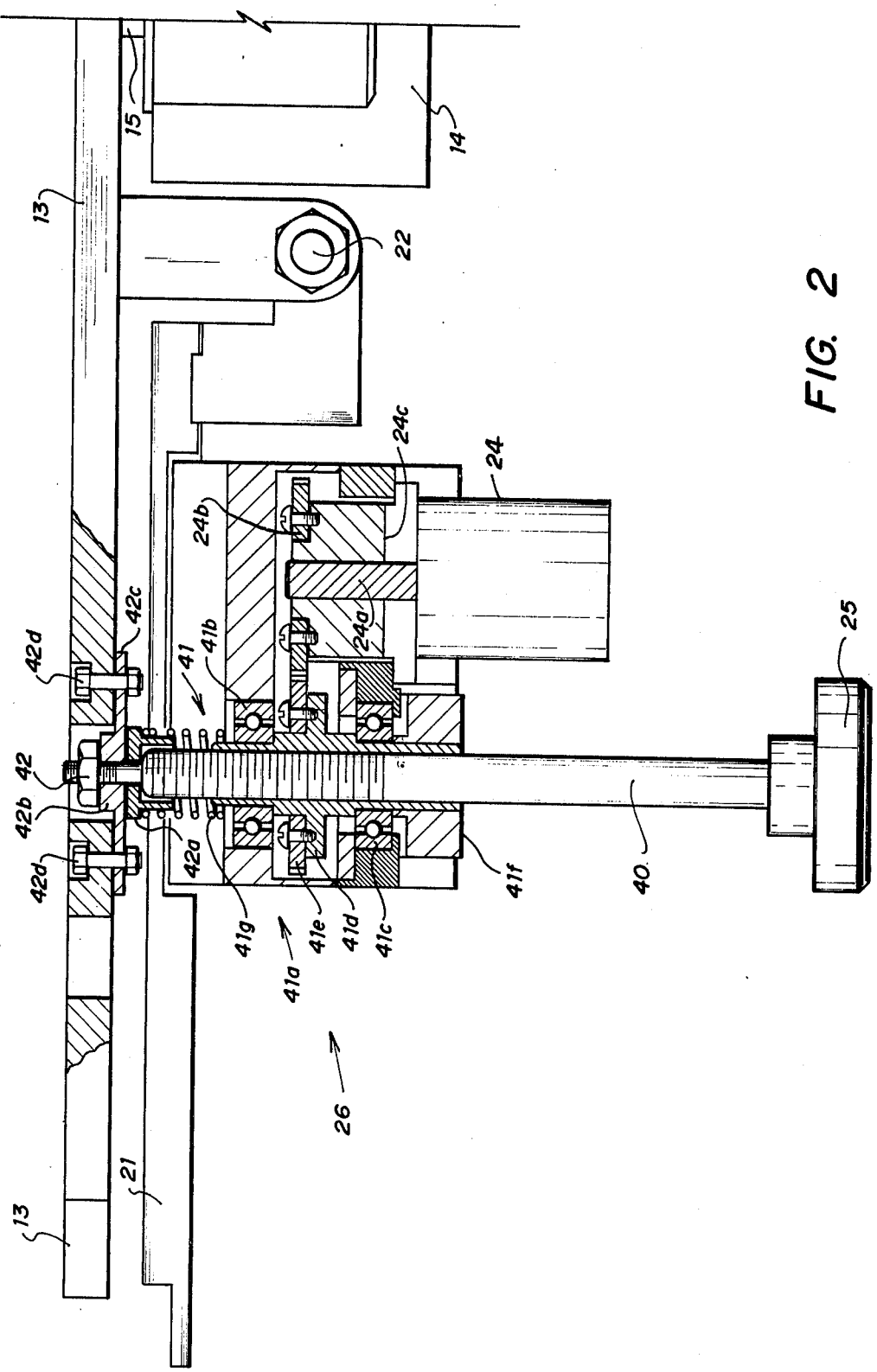
FIG. 2 is a detailed view taken transversely to FIG. 1, shown partly in section and substantially along the line 2—2 of FIG. 1 in the direction of the arrows.

FIGS. 1 and 2 illustrate a welder head support and control unit 10 to be mounted and operated on a self-propelled track-guided welding carriage 12 for making girth joints on pipelines or the like. The welding carriage may be of the type shown in detail in U.S. Pat. No. 3,806,694. The carriage 12 (not shown in detail) is provided with guide and propulsion rollers for travel circumferentially around the pipe under the guidance of a tensioned band which is secured tightly about the pipe. The welding head unit 10 is pivotally mounted on the carriage 12 which includes a transverse pivot shaft 11. Pivot shaft 11 corresponds with shaft 27 of U.S. Pat. No. 3,806,694 and thus for the purpose of the present description it will be considered that the carriage 12, its guide and propulsion systems and the band on which the carriage is propelled may be of the general type shown in U.S. Pat. No. 3,806,694 and will not be further described herein.

Welding unit 10 comprises a main side plate 13 having a hole in which pivot shaft 11 is fitted. Side plate 13 supports a welding wire supply reel 14. Reel 14 is mounted on a supporting shaft 15. Wire from reel 14 is passed through a guide tube 16, to a wire drive or feed unit 17 and thence through another flexible guide tube 18 to a welding head 19. A welding nozzle 20 through which the wire is passed to the welding arc extends from head 19. An arc is established between the wire and the work piece for carrying out a welding operation as is well known.

Main side plate 13 includes an extension arm 13a through which is threaded an adjusting screw shaft 13b, which extends and cooperates with a yoke 13c. Yoke 13c normally rests on a pin 13d to fix accurately the height of the weld head 19 relative to the carriage 12 and thus to determine the height of the tip of nozzle 20 above the bottom of the groove. Shaft 13d is fixed in and extends from the carriage 12. Rotation of the threaded shaft 13b by means of its knob 13e raises and lowers nozzle 20 to adjust its position relative to the carriage 12. This and the details of the drive means for advancing electrode wire from reel 14 are not further described here but may be as disclosed in U.S. Pat. No. 3,806,694. Similarly the provisions for flow of inert gas to nozzle 13f are known and may be as in the above patent and thus not described here.

A pivot plate 21 is provided for the support of weld head 19 as also described in the patent just mentioned. Pivot plate 21 is mounted on a shaft 22 which is supported by and is parallel to the main side plate 13. Shaft 22, which lies in a plane parallel to the welding plane of the pipe joint, is fitted in bearings which are secured to side plate 13. Pivot plate 21 is thus mounted to swing transversely or out of a plane parallel to that of the side plate 13 as may be required for the nozzle 20 to be properly positioned laterally in the groove in which a weld is to be laid down.

Pivot plate 21 also supports three nozzle control elements: (a) a stepping motor 23; (b) a secondary or course correction servo 24; and (c) a manual course adjusting knob 25. Servo 24 and manually actuatable knob 25 both may serve, as will be described, to control or adjust the mean lateral position of the nozzle 20 relative to a weld as the carriage supporting the weld unit moves along the length of the groove (i.e. orbitally around the pipe joint) as in the direction of arrow 26.

Primary Nozzle Oscillation

The function of the stepping motor 23 is to oscillate or reciprocate the nozzle 20 laterally in the weld groove by swinging the nozzle and head 19 transversely of the weld groove. The oscillations are produced by rotation of an output shaft 30 leading from a gear train (not shown) mounted in a housing 30A and driven by the stepping motor 23. Motor 23 is controlled to move nozzle 20 back and forth laterally across the welding groove and to adjust such movement so that the mean trajectory of the nozzle 20 is maintained substantially centered on the center line of the groove even though this center line deviates from a single weld plane transverse to the axis of the pipe being welded. By way of example, and in a preferred embodiment of the invention, motor 23 can be of the type manufactured and sold by Superior Electric Company of Bristol, Conn. and identified as Catalog No. M061-FC02E. The motor 23 is a stepping motor which rotates in incremental steps of a few degrees for each pulse in response to pulses applied thereto. Typically, input pulses are applied at the rate of between 250 and 500 pulses per second. The manner of control of motor 23 will be further described in connection with the circuit diagram of FIG. 3. For the purpose of understanding the mechanism illustrated in FIGS. 1 and 2, it is noted that the welding head 19 is mounted on an insulating plate 31 which is secured to a rocker mounted yoke 32. Yoke 32 is secured to shaft 30. The axis of shaft 30 preferably intersects the axis of the weld head 19. Thus, as the shaft 30 is oscillated back and forth by motor 23, the tip of nozzle 20 will oscillate back and forth transverse to the direction of travel, arrow 26, and within the groove wherein the weld is to be placed.

Figure 3:
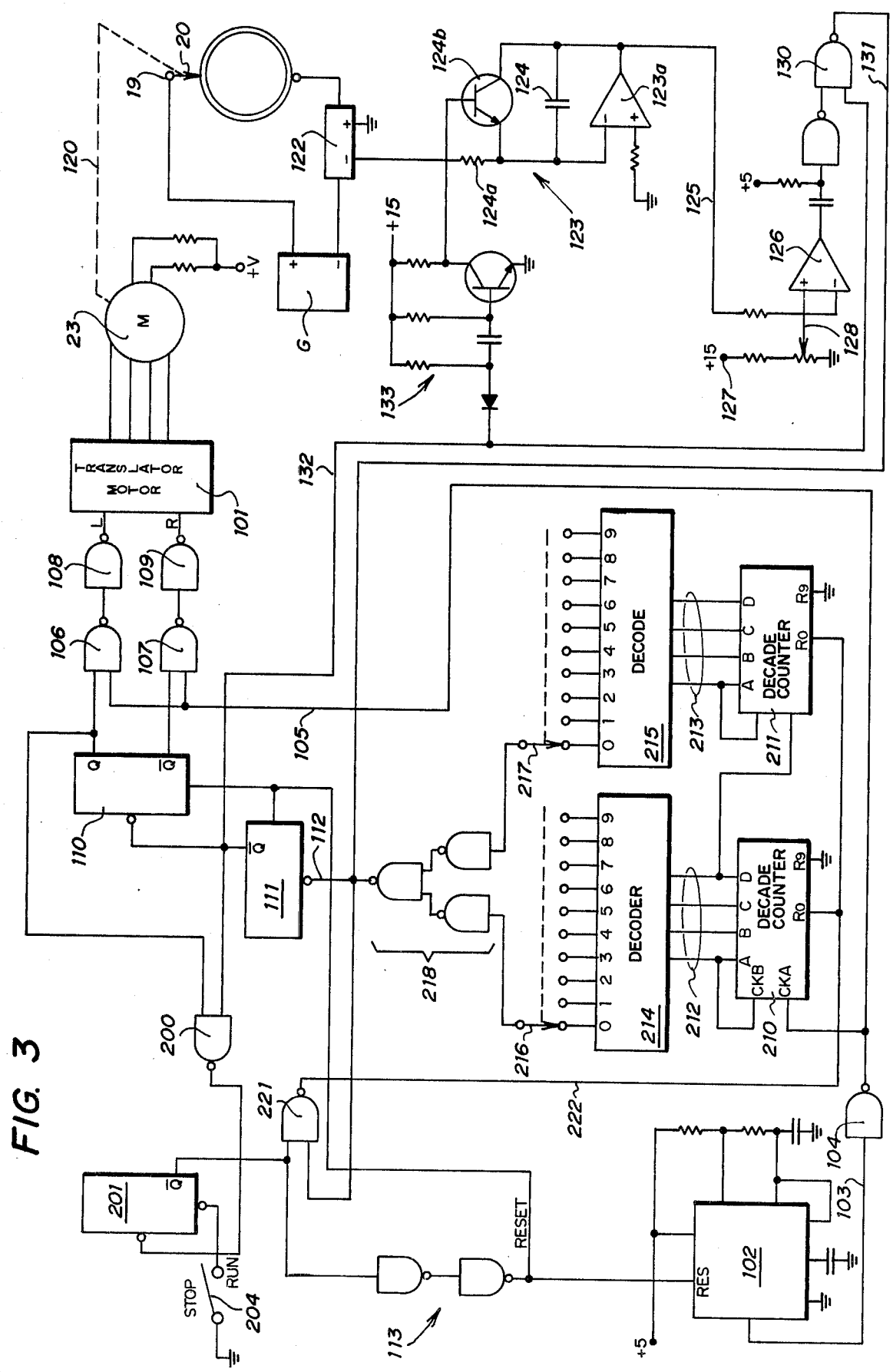
FIG. 3 is a circuit diagram of control systems for driving the nozzle of FIGS. 1 and 2.

Under control of the circuit shown in FIG. 3, the motor 23 exercises primary control over the trajectory of the nozzle 20 across the groove. Because of the high pulse rate, motor 23 appears to be in continuous operation to move the nozzle back and forth across the groove.

Manual Mean Position Control

As best shown in FIG. 2, the manually actuated knob 25 is mounted on a shaft 40 which passes through a transmission unit 41 and through retainer washers 42a, 42b, and a retainer plate 42c. Retainer plate 42c is secured to side plate 13 by bolts 42d. A retainer nut 42 is threaded on the end of shaft 40. By reason of a threaded connection between shaft 40 and transmission 41, as will be described below, rotation of the knob 25 causes the pivot plate 21 to pivot on shaft 22 so that the weld head 19, FIG. 1, moves toward or away from the plane of the main side plate 13. Thus, the mean position of the nozzle 20 relative to the plane of the weld groove can be manually adjusted by operation of the hand knob 25.

Automatic Mean Position Control

The mean position of the nozzle 20 may also be controlled by actuation of the course correction servo motor 24. Motor 24 has an output shaft 24a which drives a gear 24b on hub 24c leading to transmission 41.

More particularly as shown in FIG. 2, the transmission 41 is mounted in a housing 41a. Bearings 41b and 41c mounted in housing 41a support a gear hub 41d. A gear 41e is mounted on gear hub 41d and meshes with gear 24b, driven by motor 24 as mentioned above.

The gear hub 41d is elongated axially and has a threaded central passage which receives the threaded body portion of the control shaft 40.

A lock nut 41f secures bearing 41c in housing 41a. A spring 41g bears between the inner retainer washer 42a and the confronting surface of bearing 41b to prevent end play. In operation, when motor 24 is not energized, rotation of knob 25 causes shaft 40 to be served in or out of the threaded portion of the gear hub 41d. This causes the plate 21 to move toward or away from side plate 13 about axis 22.

If motor 24 is energized, gear 24b causes gear 41e to rotate. This rotates the gear hub 41d. The frictional forces on shaft 40 cause it to be fixed as the gear hub 41d rotates, thus moving plate 21 toward or away from plate 13.

Actuation of the course correction motor 24 may perform the same function as hand knob 25. Thus, either can be used to control the mean position of the nozzle 20 relative to the groove.

By way of example, in a preferred embodiment of the invention, the coarse correction motor 24 was a D.C. motor manufactured and sold by Globe and identified as Catalog No. 317A124-10.

In control of motor 24 in one mode, a switch arm 23a is mounted on the output shaft of the stepping motor 23. Switches 24a and 24b are adjustably mounted to cooperate with the switch arm 23a. Whenever the limits established by the adjusted positions of switches 24a and 24b are exceeded by rotation of the shaft of the stepping motor 23, then the motor 24 is actuated to correct the mean position of the nozzle 20 by rotating motor 24, until the arm 23a no longer is in contact with switch 24d or 24e.

In the embodiment of the invention described, the stepping motor 23 will accommodate typical lateral displacements of the arc in the center of the weld groove of the order from 0.030 inches to 0.060 inches where the groove itself may be of the order of 0.3000 inches wide. It has been found desirable, where deep grooves are involved, to limit the accommodation of such variations in the center of the groove by means of stepping motor 23 to about 0.030 inches to 0.060 inches and to accommodate greater deviations either by use of the hand knob 25 or the course correction motor 24. Otherwise in welding passes in the bottom of deep grooves there can be interference with the side walls of the groove by the side of nozzle 20 as motor 23 operates to maintain the mean of the traverse of nozzle 20 across the groove centered in the groove.

Control of Motor 23

Referring now to FIG. 3, stepping motor 23 is shown diagrammatically and is connected to a motor translator 101 so as to be selectively energized thereby for rotation in either clockwise or counterclockwise directions.

Motor 23 is coupled through gears represented by linkage 120 and as above described to the welding head 19 and functions to step rapidly to move the nozzle 20 laterally in the welding groove between confronting ends of two abutting pipe sections to be welded together.

Motor 23 is rotationally stepped at a preferred rate of about 350–400 steps per second, as determined by the frequency of a pulse train applied to the inputs, L or R, of translator 101. Translator 101 serves to apply proper excitation to motor 23 and may be of the type manufactured and sold by Computer Devices, 11925 Burke St., Santa Fe Springs, Calif., and identified as Rapid Syn Drive Model M43010.

Pulses applied to translator 101 are derived from a clock generator 102, lower left, FIG. 3. The output line 103 from generator 102 is connected to a line 105 by a NAND gate 104 used as an inverter. Pulses on line 105 are applied to one input of NAND gates 106 and 107. The outputs of NAND gates 106 and 107 are connected to inverters 108 and 109, respectively. The inverter outputs are coupled to the inputs of motor translator unit 101. Pulses appearing on the output of inverter 108 drive motor 23 left, or counterclockwise. Pulses appearing at the output of inverter 109 drive motor 23 to the right, or clockwise.

The passage of pulses through NAND gates 106 and 107 is controlled by the state of J-K flip-flop 110, which alternately enables NAND gates 106 and 107. Flip-flop 110 is clocked by a negative going transition at the $\overline{Q}$ output of J-K flip-flop 111. Both flip-flops 110 and 111 are reset by a logic "0" on the CLR input line provided from buffer 113. Flip-flop 111 is clocked to change state by a negative going transition on its clock input line 112.

The direction that motor 23 rotates is abruptly changed in dependence upon certain defined characteristics of the current through the welding tip. Welding nozzle 20 is illustrated diagrammatically as being coupled by linkage 120 to motor 23. Rotation of motor 23 is translated through linkage 120 and appropriate gearing to oscillate nozzle 20 back and forth across the weld zone between the pipe ends.

It is desired that the position of the nozzle relative to the side walls of the groove be a predetermined distance from the side wall on both ends of each traverse across the groove. In accordance with the present invention, this is accomplished by the utilization of a signal indicative of an integral of the welding current. Welding current is directly sensed by connections to generator G through element 122. A variable voltage, representative of highly variable welding current, is developed across shunt element 122 and is applied to an integrator circuit 123. Integrator circuit 123 comprises an operational amplifier 123a, a feedback and, a resistor 124a. A transistor 124b is part of a reset circuit. The voltage due to charge accumulating on capacitor 124 in the integrator circuit 123 is applied over line 125 to voltage comparator 126.

A first input of comparator 126 receives the integrated signal. The second input of comparator 126 is connected to a source of reference voltage 127 through a potentiometer 128, the wiper of which is connected to the second comparator input.

As the arc from nozzle 20 traverses the weld groove, capacitor 124 is charged. When the output voltage from integrator 123 exceeds the reference voltage on the wiper of potentiometer 128, the output from comparator 126 changes state causing a transition from a "high" state to a "low" state at the output of NAND gate 130.

The reference voltage on the tap of potentiometer 128 may be adjusted to correspond to a given welding condition.

The output of NAND gate 130 is applied over line 131 to the clock input 112 of flip-flop 111. Every other clocking of flip-flop 111 results in the clocking of flip-flop 110 and a change of state of that device. With each change of state, the direction of the stepping motor 23 is changed, with the nozzle 20 being driven in the opposite direction across the groove.

The $\overline{Q}$ output of flip-flop 111 is also applied over line 132 to a reset circuit 133. Thus, concurrently with alternating changes of state of flip-flop 111, the capacitor 124 is discharged through transistor 124b, and a new charging cycle takes place. The integrator accumulates charge until the voltage therein again exceeds the reference voltage, whereupon flip-flop 111 again toggles to clock flip-flop 110 and initiates a change in the direction of rotation of motor 23 with every other change of state of flip-flop 111.

It will be noted that the $\overline{Q}$ output of flip-flop 110 as well as line 132 are connected by way of NAND gate 200 to a reset flip-flop 201. The $\overline{Q}$ output of flip-flop 201 is then connected by way of NAND buffer 113 to reset flip-flops 110 and 111 and also resets clock generator 102.

Preset Traverse Control

The system shown in FIG. 3 also includes means whereby the length of the traverse of the welding arc may be given a preset limit independently of integrator 123. This is accomplished by applying the output of the clock generator 102 through inverter 104 to the inputs for decade counters 210 and 211. Counters 210 and 211 are connected in series. The outputs are connected by way of lines 212 and 213 to decoders 214 and 215, respectively. The outputs of decoders 214 and 215 are provided with selector switches 216 and 217, respectively. Thus, any selected number of pulses up to a total of 99 can be utilized to limit the number of steps the motor 23 may take in a given half of a traverse before a pulse from AND circuit 218 is applied to line 112 to toggle flip-flop 111 on each pulse and flip-flop 110 on every other pulse.

In operation, if the arc at nozzle 20 is to be moved by motor 23 no more than 50 steps in any one-half traverse, then switch 216 is set at zero and switch 217 is set at the number 5 output. With the switches so set, if the integral of the welding current dos not cause reversal of motor 23 by the time the motor 23 has taken 100 steps, then the outputs of the decoders 214 and 215, through AND circuit 218, would cause flip-flop 110 to toggle and reverse motor 23.

The flip-flop 201 is toggled one way to start system operation and the other way to stop. The $\overline{Q}$ output of flip-flop 201 is applied through buffer 113 in order to reset clock generator 102 and to reset flip-flops 110 and 111 and through gate 221 in order to reset decade counters 210 and 211.

Assume start up and run with the welding tip 20 located adjacent one edge of the groove and with flip-flop 110 set to run motor 23 to drive the arc towards the opposite edge of the groove. Closure of switch 204 initiates operation of the clock generator 102 thus starting the motor 23 to drive the arc towards the opposite edge of the groove. When the integrator voltage exceeds the reference voltage on comparator 126, the motor direction is reversed to run the tip back across the groove thus beginning the arc reciprocation under control of the integrator-comparator.

At count set in switches 216 and 217, the arc will be about one-half the traverse across the groove and flip-flop 111 will be toggled. The motor continues to drive the arc without change of direction across the groove toward the other edge. Motor 23 will thereafter reverse direction upon the first to occur of (i) the integrator output exceeding the reference voltage, or (ii) the output of decoders enabling the lines selected by the setting of switches 216 and 217.

It will be understood that although the above description relates primarily to the welding of adjacent ends of pipe or similar cylindrical hollow work members together, as in the building of pipelines where the pipes cannot be rotated, the invention is not limited to such design or use. It may be used for welding together adjacent ends of pipes which are rotated, the welding device per se being essentially stationary. The invention also may be used for joining together the edges of flat metal plates, or flanges of angle members, structural beams, and the like, whether the welding equipment is moved along the joints, or the welding equipment is held stationary and the work moved past it, or even where both the work and the welding equipment are moved.

Having described in detail the preferred embodiment of the method and apparatus of the present invention, the same being illustrated in the accompanying drawings, it will be evident to one of ordinary skill in the art that various modifications and applications are possible within the scope and spirit of the invention and such modifications and applications are incorporated herein by reference and in the appended claims.

What is claimed is:

1. An apparatus for welding by filling a gap between adjoining work members with weld metal, which includes a gas shielded arc nozzle for melting and depositing metal in said gap, the combination which comprises:
    (a) a reversible motor coupled to said nozzle for driving said nozzle laterally across the gap;
    (b) means to integrate the current that flows in said arc and to accumulate a physical representation of the magnitude of the resulting integral; and
    (c) means to arrest said motor each time said magnitude reaches a predetermined threshold value, and to reverse the direction of travel of said motor.

2. Apparatus according to claim 1 which includes means for diverting a small current from the welding current which is directly proportional to said welding current, and means for integrating said small current whereby when said integral reaches a predetermined value, the motor will operate to change the direction of movement of said nozzle laterally with respect to the gap.

3. Apparatus according to claim 1 in which means are also included for adjusting the level of the threshold to vary the width of oscillation travel of the nozzle.

4. Apparatus according to claim 1 for welding together adjacent ends of annular work members, which includes a pivot mounting said nozzle and means driven by said reversible motor for reciprocating said nozzle about its pivot mount.

5. The combination which includes:
    (a) means for sensing current flow through an arc which includes means parallel to the arc circuit for taking a small but proportionate current value and integrating said value;
    (b) first means for driving said arc in successive traverses across a gap, and for effecting said integration of said small current value during each traverse across said gap wherein the magnitude of a given traverse is limited when an integral of said small current value exceeds a reference value; and
    (c) a second means for shifting the center of the traverse of said arc, said means being operable only when the center of said arc gap differs from the mean position of said arc.

6. Combination according to claim 5 in which the gap to be filled is between adjoining ends of pipe and which includes means for locating the arc and moving it around the pipe ends to fill said gap with weld metal.

7. In the method of controlling the spatial position of a welding tip with respect to opposed edges of a predetermined weld groove in which said tip operates, the improvement which includes the following steps, in combination:
    (a) integrating the weld current while reciprocating said tip respectively towards said opposed edges;

(b) continuously comparing the integral of said current with the value of a predetermined reference condition; and (c) reversing the direction of motion of said tip and re-initiating integration of said current each time said integral exceeds said reference condition.

8. Method according to claim 7 in which a smaller current than the actual welding current but always proportional thereto is integrated.

9. Method according to claim 7 applied to filling a circumferential weld groove between adjoining end portions of pipe lengths having similar diameters.

10. Method according to claim 7 applied to the welding together of adjacent pipe ends in which a small shunt current proportional to the welding current is integrated.

11. Method according to claim 7 which includes the step of adjusting automatically the mean position of the welding tip to keep it substantially in the middle of said weld groove.

12. Method according to claim 11 in which said step of automatically adjusting takes place only when the tip main position has wandered significantly from the center of the weld groove.

* * * * *

UNITED STATES PATENT AND TRADEMARK OFFICE
CERTIFICATE OF CORRECTION

PATENT NO. : 4,158,124
DATED : June 12, 1979
INVENTOR(S) : Talbert D. Connell

It is certified that error appears in the above-identified patent and that said Letters Patent are hereby corrected as shown below:

Column 1, line 19                        "piperline"
should be --pipeline--.

Column 3, line 30                            "13d"
should be --13b--.

Column 6, line 30                    after "through"
insert --shunt--;
               line 34                       "a feedback and,"
should be --a feedback capacitor 124, and--.

Signed and Sealed this

Fourth      Day of    December 1979

[SEAL]

*Attest:*

SIDNEY A. DIAMOND

*Attesting Officer*          *Commissioner of Patents and Trademarks*